US012744550B2

(12) United States Patent
Cho et al.

(10) Patent No.: US 12,744,550 B2
(45) Date of Patent: Sep. 22, 2026

(54) O-RAN REMOTE UNIT SYSTEM FOR MULTI-CARRIER AND MULTI-FREQUENCY BAND BASED ON O-RAN STANDARD

(71) Applicant: ADRF KOREA, Inc., Icheon-si (KR)

(72) Inventors: Chan Ki Cho, Icheon-si (KR); Hyun Kyung Song, Gwangju-si (KR)

(73) Assignee: ADRF KOREA, Inc., Icheon-si (KR)

( * ) Notice: Subject to any disclaimer, the term of this patent is extended or adjusted under 35 U.S.C. 154(b) by 310 days.

(21) Appl. No.: 18/225,741

(22) Filed: Jul. 25, 2023

(65) Prior Publication Data

US 2025/0015817 A1 Jan. 9, 2025

(30) Foreign Application Priority Data

Jul. 3, 2023 (KR) ........................ 10-2023-0085459

(51) Int. Cl.
*H04B 1/00* (2006.01)
*H04B 1/40* (2015.01)

(52) U.S. Cl.
CPC ............. *H04B 1/0064* (2013.01); *H04B 1/40* (2013.01)

(58) Field of Classification Search
CPC ................................ H04B 1/0064; H04B 1/40
See application file for complete search history.

(56) References Cited

U.S. PATENT DOCUMENTS 6,473,603 B1 * 10/2002 Toncich ............... H04B 1/3877 455/67.11
7,418,271 B2 * 8/2008 Hovers .................. H01Q 25/00 455/550.1
10,433,260 B1 * 10/2019 Krishnamachari ... H04W 52/26
2003/0064681 A1 * 4/2003 Uedo .................... H04W 74/04 455/3.06
2004/0229562 A1 * 11/2004 Wren ...................... H04L 27/02 455/3.01
2007/0129010 A1 * 6/2007 Chen ...................... D04H 1/728 455/127.1
2017/0373890 A1 * 12/2017 Fertonani ............. H04B 1/1661
2019/0150004 A1 * 5/2019 Buel ..................... H04W 16/28 370/310
2022/0159689 A1 * 5/2022 Huang .................. H04W 72/23
2023/0030066 A1 * 2/2023 Takeda ................ H04W 72/542
2023/0067773 A1 * 3/2023 Chun ............... H04B 10/25759
2024/0039593 A1 * 2/2024 Irvine .................. H04B 7/0617

* cited by examiner

*Primary Examiner* — Nguyen T Vo
(74) *Attorney, Agent, or Firm* — Dinsmore & Shohl LLP; Yongsok Choi, Esq.

(57) ABSTRACT

An open radio access network (O-RAN) radio unit (RU) system includes an O-RU digital part and one or more smart antenna modules. The O-RU digital part includes a fronthaul transport layer configured to transmit and receive a signal to and from a distributed unit (DU), a low physical layer (Low PHY) configured to process a signal according to an O-RAN division standard received through the fronthaul transport layer, a digital front end (DFE) configured to perform digital-to-analog conversion on a signal transmitted by the low physical layer, and a first radio frequency (RF) interface configured to transmit and receive a signal to and from the smart antenna module. Each of the one or more smart antenna modules includes a second RF interface configured to transmit and receive a signal to and from the O-RU digital part, and a radio frequency front end (RF FE).

7 Claims, 5 Drawing Sheets

O-RAN REMOTE UNIT SYSTEM FOR MULTI-CARRIER AND MULTI-FREQUENCY BAND BASED ON O-RAN STANDARD

CROSS-REFERENCE TO RELATED APPLICATIONS

This application claims priority to Korean Patent Application No. 10-2023-0085459 filed on Jul. 3, 2023, the entire contents of which are herein incorporate by reference.

BACKGROUND

1. Field

The disclosure relates to an open radio access network (O-RAN) remote unit (O-RU) system for multiple carriers and multiple frequency bands according to an O-RAN standard for constructing a next-generation wireless infrastructure. More particularly, the disclosure relates to an O-RU system usable in in-building distributed network structures for multiple carriers and multiple frequency bands.

2. Description of the Related Art

An open radio access network (O-RAN) standard provided under the principles of intelligence and openness is a basis for building a virtualized RAN on open hardware and in a cloud through artificial intelligence (AI)-based radio control. The O-RAN standard was created to ensure a broad vendor community driven by innovation and open market competition and also accelerate the delivery of products that support a common open architecture and standardized interfaces that we, as operators, see as the basis for next-generation wireless infrastructures.

In constructing a next-generation wireless infrastructure through the O-RAN standard, an O-RU is developed as a remote unit for a specific frequency band or specific carrier as in an existing base station system, and these products are developed and provided to the specific carrier.

However, in a market environment where a wireless infrastructure is to be built, multiple carriers and multiple frequency bands need to be served simultaneously. However, in an RU structure of a conventional O-RAN system, although there is no problem in servicing a single frequency band, use in in-building distributed network structures for multiple frequency bands and multiple carriers is difficult. Therefore, a new structure of an O-RU system suitable for in-building distributed network structures for accommodating multiple frequency bands and multiple carriers is needed.

SUMMARY

Provided is an open radio access network (O-RAN) remote unit (RU) (O-RU) system including an O-RU digital part and a smart antenna module separated from each other so as to be suitable for in-building distributed network structures for accommodating multiple frequency bands and multiple carriers.

Provided is an O-RU system including and controlling a plurality of smart antenna modules to accommodate multiple frequency bands and multiple carriers.

Provided is an O-RU system capable of minimizing power consumption of a smart antenna module, adjusting a power ratio for each signal according to a user's demand by enabling power ratios for each frequency band and each carrier to be set, and maintaining a service quality stably and efficiently.

The technical problems of the disclosure are not limited to the above-mentioned contents, and other technical problems not mentioned will be clearly understood by a person skilled in the art from the following description.

According to an embodiment, an O-RAN RU system for multiple carriers and multiple frequency bands based on an O-RAN standard includes an O-RU digital part and one or more smart antenna modules. The O-RU digital part includes a fronthaul transport layer configured to transmit and receive a signal to and from a distributed unit (DU), a low physical layer (Low PHY) configured to process a signal according to an O-RAN division standard received through the fronthaul transport layer, a digital front end (DFE) configured to perform digital-to-analog conversion on a signal transmitted by the low physical layer, and a first radio frequency (RF) interface configured to transmit and receive a signal to and from the smart antenna module. Each of the one or more smart antenna modules includes a second RF interface configured to transmit and receive a signal to and from the O-RU digital part, and a radio frequency front end (RF FE) connected between one or more antennas and the second RF interface and configured to process an RF signal. The first RF interface and the second RF interface are connected by a transmission line.

The O-RU digital part may include a first controller for controlling the fronthaul transmission layer, the low physical layer, the DFE, and the first RF interface, and the smart antenna module may include a second controller for controlling the second RF interface and the RF FE.

The first controller may be configured to remotely monitor a status of the second controller and control the second controller in real time.

The smart antenna module may be configured to operate only when data is transmitted to the smart antenna module by the second controller.

The second controller may be configured to pre-set a ratio of signal power level for each multi-frequency band or multi-carrier received from the DU.

The second controller may control the signal power level so that a signal of a specific carrier does not exceed a preset ratio.

The transmission line may be an optical cable, and the first RF interface and the second RF interface may include optical converters.

The transmission line may be a coaxial cable, and the first RF interface and the second RF interface may include dividers.

The transmission line may be an Ethernet cable, and the first RF interface and the second RF interface may include Ethernet switches.

The smart antenna module may further include a wireless modem for communicating with the O-RU digital part.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
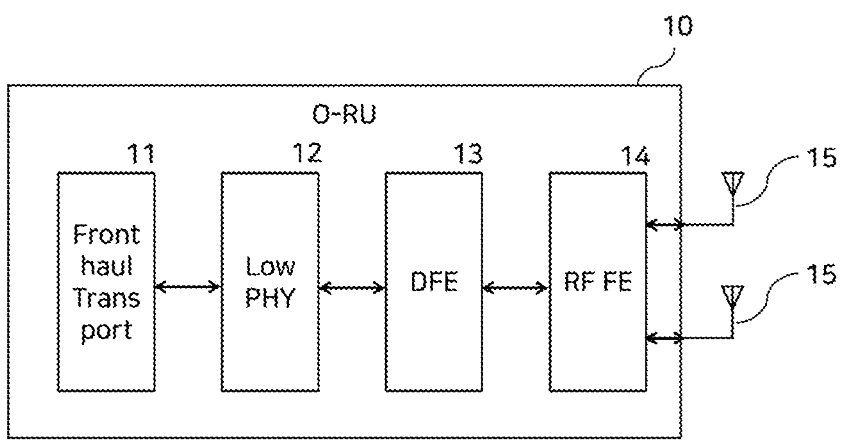
FIG. 1 is a block diagram of a structure of a conventional open radio access network (O-RAN) remote unit (RU) (O-RU)

Embodiments of the disclosure will now be described more fully with reference to the accompanying drawings such that one of ordinary skill in the art to which the disclosure pertains may easily execute the disclosure. The disclosure may, however, be embodied in many different forms and should not be construed as being limited to the embodiments set forth herein. In the drawings, elements irrelevant to the descriptions of the disclosure are omitted to clearly explain embodiments of the disclosure.

The terms used in the present specification are merely used to describe particular embodiments, and are not intended to limit the disclosure. An expression used in the singular may encompass the expression of the plural, unless it has a clearly different meaning in the context.

In the present specification, it may be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

In addition, the components shown in the embodiments of the disclosure are shown independently to indicate different characteristic functions, and do not mean that each component is separate hardware or one software component. In other words, for convenience of description, each component is listed and described as each component, and at least two components of each component may be combined to form one component, or one component may be divided into a plurality of components to perform a function. The integrated and separate embodiments of each component are also included in the scope of the disclosure without departing from the essence of the disclosure.

Hereinafter, the disclosure will be described more fully with reference to the accompanying drawings, in which embodiments of the disclosure are shown.

FIG. 1 is a block diagram of a structure of a conventional open radio access network (O-RAN) remote unit (RU) (O-RU).

Referring to FIG. 1, a conventional O-RU 10 is configured to be suitable for supporting a service of a single frequency band or a single carrier. A fronthaul transport layer 11 may be configured to transmit and receive signals to and from a distributed unit (DU), a low physical layer 12 may be configured to process a signal according to an O-RAN division 7.2× standard, a digital front end (DFE) 13 may be configured to perform digital-to-analog conversion and analog-to-digital conversion, and a radio frequency front end (RF FE) 14 may be connected to one or more antennas 15 to process a radio frequency signal.

However, because an antenna module for RF signal processing is embedded in an O-RU as described above, a plurality of O-RUs suitable for each frequency band or each carrier need to be installed. Thus, a lot of cost is incurred in installing the plurality of O-RUs in order to provide a service that supports multiple frequency bands and multiple carriers.

Figure 2:
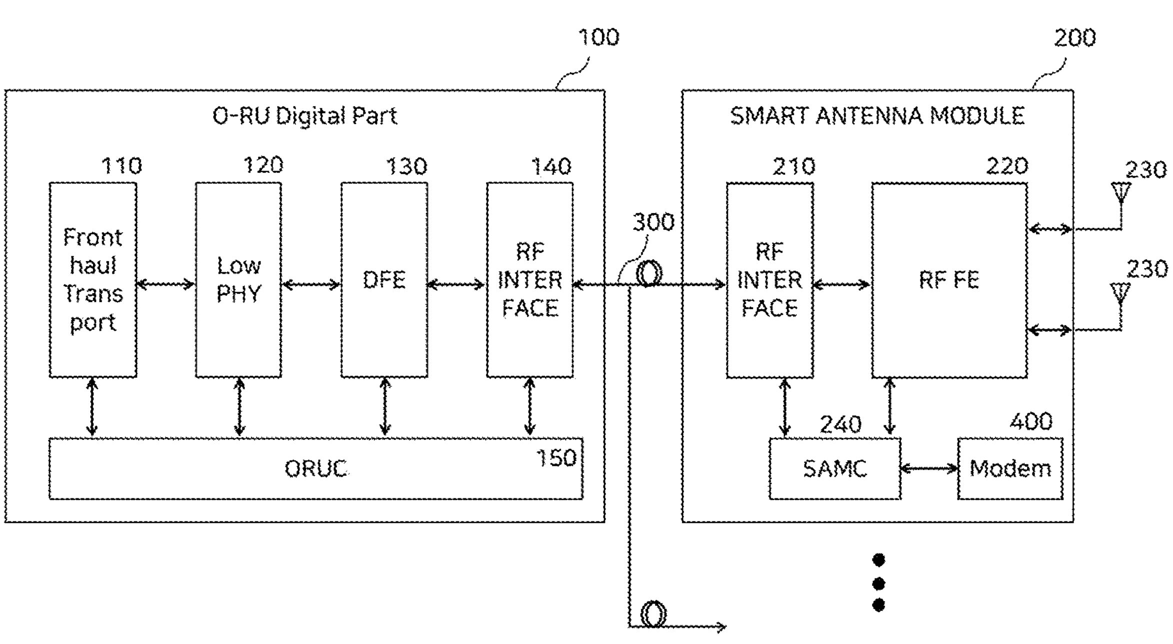
FIG. 2 is a block diagram of a structure of an O-RU in which an O-RU digital part and a smart antenna module are separated from each other, according to an embodiment of the disclosure.

FIG. 2 is a block diagram of a structure of an O-RU in which an O-RU digital part and a smart antenna module are separated from each other, according to an embodiment of the disclosure.

In FIG. 2, an O-RU digital part 100 and a smart antenna module 200 may be separated from each other to be suitable for an in-building distributed network structure for accommodating multiple frequency bands and multiple carriers, and the smart antenna module 200 may be connected to an external antenna to enable a service. A plurality of smart antenna modules 200 are included to support multiple frequency bands and multiple carriers. The O-RU digital part 100 may include an O-RU controller (ORUC) 150 for controlling the O-RU digital part 100, the smart antenna module 200 may include a smart antenna module controller (SAMC) 240 for controlling the smart antenna module 200, and the ORUC 150 and the SAMC 240 may be configured to communicate with each other.

Looking at the configuration of the O-RU digital part 100 in more detail, a fronthaul transport layer 110 is configured to transmit and receive signals to and from a DU. For example, a downlink signal input through an enhanced common public radio interface (eCPRI) in an O-DU extracts an IEEE 1588 synchronization signal from a signal transmitted to the fronthaul transport layer 110, and the downlink signal may be transmitted to a low physical layer 120.

The low physical layer 120 is configured to process a signal according to an O-RAN division 7.2× standard received through the fronthaul transport layer 110, and the low physical layer 120 converts the received downlink signal into a baseband signal by using an FPGA or ASIC and transmits the baseband signal to a DFE 130. At this time, an uplink signal may transmit a signal input through the DFE 130 to the fronthaul transport layer 110 through the low physical layer 120. In the low physical layer 120, for example, FFT/iFFT of signals, cycle prefix (CP) addition and removal, and a physical random access channel (PRACH) function may be performed.

The DFE 130 may be configured to perform digital-to-analog conversion on the signal transmitted by the low physical layer 120, and may transmit an input signal to a first radio frequency (RF) interface 140 for transmitting an RF signal having undergone digital-to-analog conversion through a digital down converter (DDC) to the smart antenna module 200 through a transmission line 300 such as an optical cable, a coaxial cable, or an Ethernet cable. The uplink signal may undergo analog-to-digital conversion through a digital up converter (DUC) and may be input to the DFE 130.

The first RF interface 140 is a component for transmitting and receiving signals to and from the smart antenna module 200, and may be implemented as an optical interface, a coaxial cable interface, an Ethernet interface, or the like. The first RF interface 140 and a second RF interface 210 of the smart antenna module 200 may be connected to each other through the transmission line 300 that may be implemented as an optical cable, a coaxial cable, an Ethernet cable, or the like.

Regarding the smart antenna module 200, the second RF interface 210 may be configured to transmit and receive signals to and from the O-RU digital part 100, and an RF FE 220 may be connected between one or more external antennas 230 and the second RF interface 210 to process an RF signal.

In this case, a downlink signal transmitted to the smart antenna module 200 through the second RF interface 210 may be amplified through a high power amplifier (AMP) and processed through a circulator and a band pass filter (BPF) through the RF FE 220 and the processed signal may be transmitted to the antenna 230. In case of an uplink signal, a signal input through the antenna 230 is input so that only a desired signal band is input through the BPF, a downlink signal and an uplink signal are separated from each other through the circulator, and a signal obtained by processing the uplink signal through a low noise amplifier may be transmitted to the DFE 130 of the O-RU digital part 100.

The ORUC 150 of the O-RU digital part 100 may be configured to control the fronthaul transport layer 110, the low physical layer 120, the digital front end 130, and the first RF interface 140, and a SAMC 240 of the smart antenna module 200 may be configured to control the second RF interface 210 and the RF FE 220. In this case, the ORUC 150 may be configured to remotely monitor the status of the SAMC 240 and enable real-time control of the SAMC 240. The smart antenna module 200 may be controlled through the SAMC 240 to operate only when data is transmitted to the smart antenna module 200, for example, only when an uplink signal is transmitted from a user terminal, and TDD switching signals and various operations may be controlled in real time, so that power consumed by the smart antenna module 200 may be effectively minimized.

The SAMC 240 may perform an auto install function, and set a signal level input from a DU for each multi-frequency and each multi-carrier as a level and gain desired by a user in a percentage ratio, thereby implementing a function enabling output according to a preset ratio desired by the user for each frequency band and each carrier.

According to the disclosure, a plurality of smart antenna modules 200 may be physically located apart from one another. In this case, an output quality of the plurality of smart antenna modules 200 may be stably maintained by adjusting a signal strength of a smart antenna module 200 at each location through output level and gain control of the SAMC 240.

A signal output level may be controlled through the SAMC 240 so that a signal of a specific carrier does not exceed a preset ratio. This function may prevent a change in power ratio so that a signal of one carrier does not exceed a preset ratio when being input higher than a preset level set in an auto-installation stage. Accordingly, a power ratio of each carrier that is output may be kept constant, and as a result, a service quality may be stably maintained in in-building distributed networks for multiple frequency bands and multiple carriers. An efficient service tailored to a specific event or situation may be provided by adjusting a signal power ratio for each frequency band or each carrier as needed on a specific date and time zone.

The ORUC 150 may efficiently control each of the plurality of smart antenna modules 200 through the auto-install function of the plurality of smart antenna modules 200 and perform a function interoperating with an upper device. In other words, all information of the SAMC 240 may be transmitted to the ORUC 150, and thus the ORUC 150 may control and manage the plurality of SAMCs 240.

The smart antenna module 200 may be configured to enable wireless communication with the ORUC 150 of the O-RU digital part 100 through a separate wireless modem 400, and the ORUC 150 may be connected to the SAMC 240 through wireless communication using the wireless modem 400 or wired communication through the transmission line 300 and accordingly may control and manage the plurality of SAMCs 240.

Figure 3:
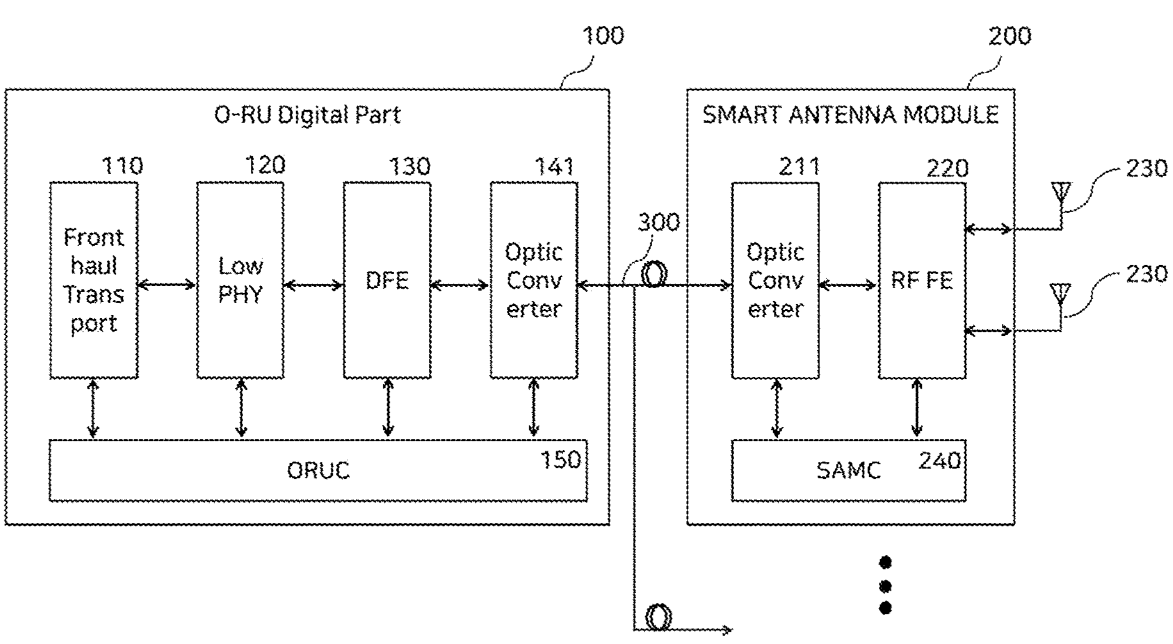
FIG. 3 is a block diagram of a structure of an O-RU in which an O-RU digital part and a smart antenna module are connected to each other through an optical cable, according to an embodiment of the disclosure.

FIG. 3 is a block diagram of a structure of an O-RU in which an O-RU digital part and a smart antenna module are connected to each other through an optical cable, according to an embodiment of the disclosure.

FIG. 3 is an example in which the transmission line 300 is implemented as an optical cable in the structure of FIG. 2. In this case, an optical converter 141 of the O-RU digital part 100 may convert an input downlink RF signal into an optical signal, and an uplink signal may be inputted to an optical converter 211 of the smart antenna module 200 and the optical signal is converted to an RF signal into and the RF signal may be transmitted to the DFE 130.

Figure 4:
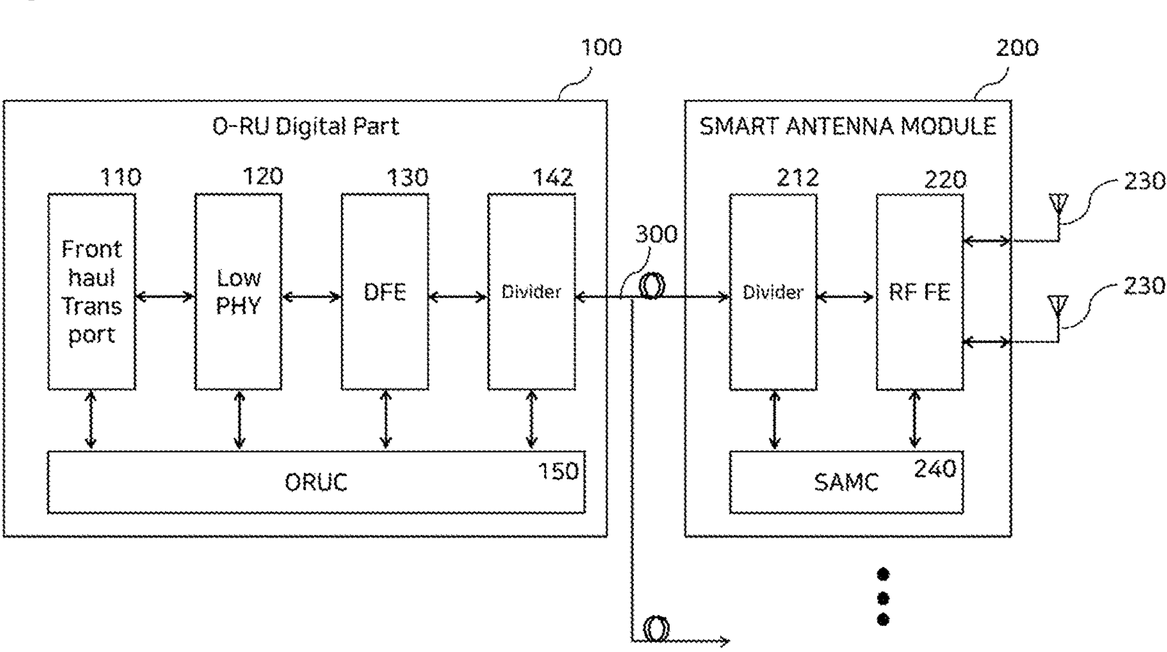
FIG. 4 is a block diagram of a structure of an O-RU in which an O-RU digital part and a smart antenna module are connected to each other through a coaxial cable, according to an embodiment of the disclosure.

FIG. 4 is a block diagram of a structure of an O-RU in which an O-RU digital part and a smart antenna module are connected to each other through a coaxial cable, according to an embodiment of the disclosure.

In FIG. 4, the transmission line 300 is implemented as a coaxial cable in the structure of FIG. 2, and an RF signal may be converted and transmitted/received through a divider 142 of the O-RU digital part 100 and a divider 212 of the smart antenna module 200.

Figure 5:
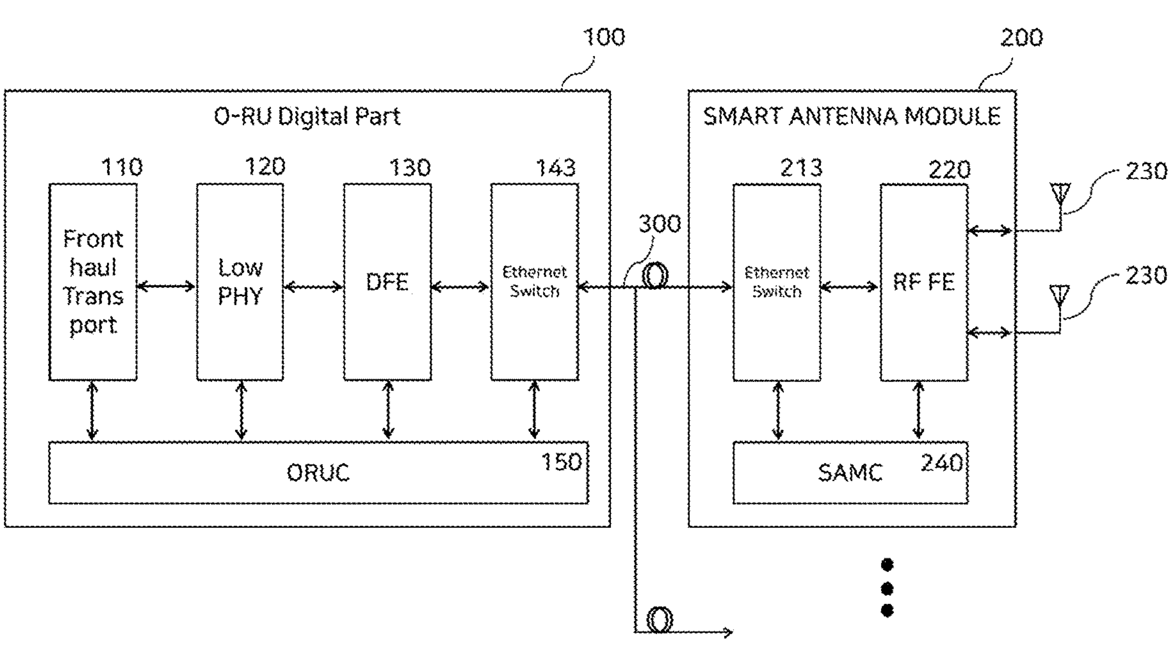
FIG. 5 is a block diagram of a structure of an O-RU in which an O-RU digital part and a smart antenna module are connected to each other through an Ethernet cable, according to an embodiment of the disclosure

FIG. 5 is a block diagram of a structure of an O-RU in which an O-RU digital part and a smart antenna module are connected to each other through an Ethernet cable, according to an embodiment of the disclosure.

In FIG. 5, the transmission line 300 is implemented as an Ethernet cable in the structure of FIG. 2, and an RF signal may be converted and transmitted/received through an Ethernet 143 of the O-RU digital part 100 and an Ethernet switch 213 of the smart antenna module 200.

According to the disclosure, there is provided an open radio access network (O-RAN) remote unit (RU) (O-RU) system including an O-RU digital part and a smart antenna module separated from each other so as to be suitable for in-building distributed network structures for accommodating multiple frequency bands and multiple carriers.

According to the disclosure, there is provided an O-RU system including and controlling a plurality of smart antenna modules to accommodate multiple frequency bands and multiple carriers.

According to the disclosure, there is provided an O-RU system capable of minimizing power consumption of a smart antenna module, adjusting a power ratio for each signal according to a user's demand by enabling power ratios for each frequency band and each carrier to be set, and maintaining a service quality stably and efficiently.

The effects of the disclosure are not limited to the above-mentioned contents, and other effects not mentioned will be clearly understood by a person skilled in the art from the following description.

While the disclosure have been described with reference to the figures, it will be understood by those of ordinary skill in the art that various changes in form and details may be made therein without departing from the spirit and scope of the disclosure as defined by the following claims.

What is claimed is:

1. An open radio access network (O-RAN) radio unit (RU) (O-RU) system for multiple carriers and multiple frequency bands based on an O-RAN standard, the O-RAN RU system comprising an O-RU digital part and a plurality of smart antenna modules configured to support multiple frequency bands and multiple carriers, wherein the O-RU digital part comprises:

a fronthaul transport layer configured to transmit and receive a signal to and from a distributed unit (DU);

a low physical layer (Low PHY) configured to process a signal according to an O-RAN division standard received through the fronthaul transport layer;

a digital front end (DFE) configured to perform digital-to-analog conversion on a signal transmitted by the low physical layer; and a first radio frequency (RF) interface configured to transmit and receive a signal to and from the smart antenna module, each of the plurality of smart antenna modules comprises:

a second RF interface configured to transmit and receive a signal to and from the O-RU digital part; and a radio frequency front end (RF FE) connected between one or more antennas and the second RF interface and configured to process an RF signal, and the first RF interface and the second RF interface are connected by a transmission line, wherein the O-RU digital part comprises a first controller for controlling the fronthaul transport layer, the low physical layer, the DFE, and the first RF interface, and the smart antenna module comprises a second controller for controlling the second RF interface and the RF FE, and wherein the second controller of each of the plurality of smart antenna modules independently controls a signal output level of the respective smart antenna module and all information of the second controller is transmitted to the first controller such that the first controller controls the plurality of smart antenna modules and transmits information about each of the plurality of smart antenna modules to the first controller such that the first controller controls the plurality of smart antenna modules, wherein the second controller is configured to pre-set a percentage of signal power level for each multi-frequency band or multi-carrier received from the DU, and wherein the second controller controls the signal power level so that a signal of a specific carrier does not exceed the pre-set percentage.

2. The O-RAN RU system of claim 1, wherein the first controller is configured to remotely monitor a status of the second controller and control the second controller in real time.

3. The O-RAN RU system of claim 2, wherein the smart antenna module is configured to operate only when data is transmitted to the smart antenna module by the second controller.

4. The O-RAN RU system of claim 1, wherein the transmission line is an optical cable, and the first RF interface and the second RF interface include optical converters.

5. The O-RAN RU system of claim 1, wherein the transmission line is a coaxial cable, and the first RF interface and the second RF interface include dividers.

6. The O-RAN RU system of claim 1, wherein the transmission line is an Ethernet cable, and the first RF interface and the second RF interface include Ethernet switches.

7. The O-RAN RU system of claim 1, wherein the smart antenna module further comprises a wireless modem for communicating with the first controller of the O-RU digital part.

* * * * *